Figure 1:
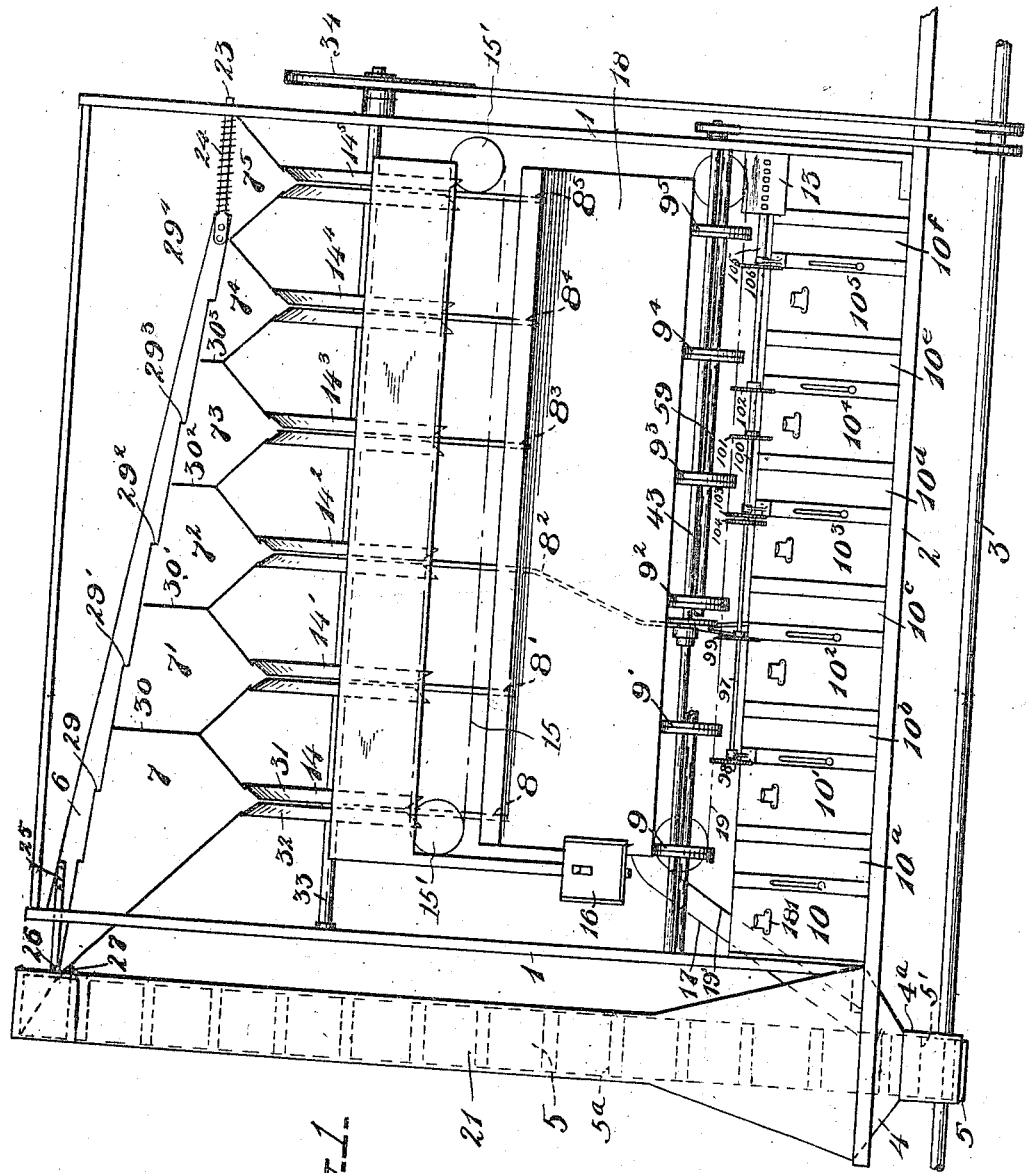

C. S. BATDORF.
AUTOMATIC COIN SEPARATING, ADDING, COUNTING, AND BAGGING MACHINE.
APPLICATION FILED AUG. 18, 1909.

1,168,461.

Patented Jan. 18, 1916.
9 SHEETS—SHEET 1.

Witnesses:

Inventor
C. S. BATDORF
By Attorney

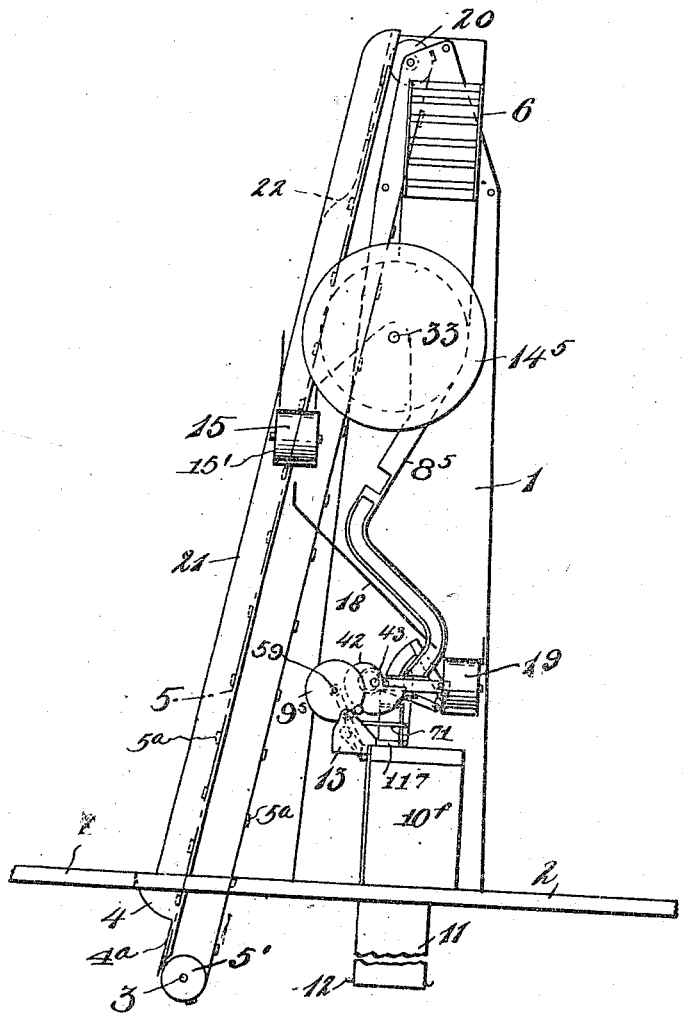

C. S. BATDORF.
AUTOMATIC COIN SEPARATING, ADDING, COUNTING, AND BAGGING MACHINE.
APPLICATION FILED AUG. 18, 1909.
1,168,461.
Patented Jan. 18, 1916.
9 SHEETS—SHEET 3.
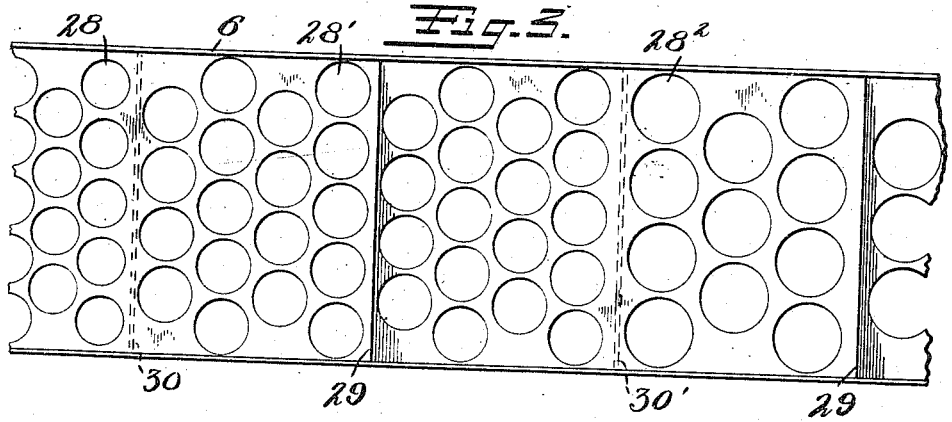
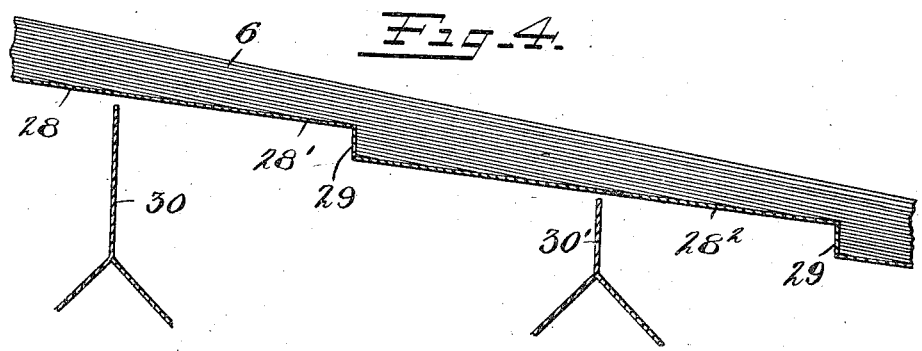
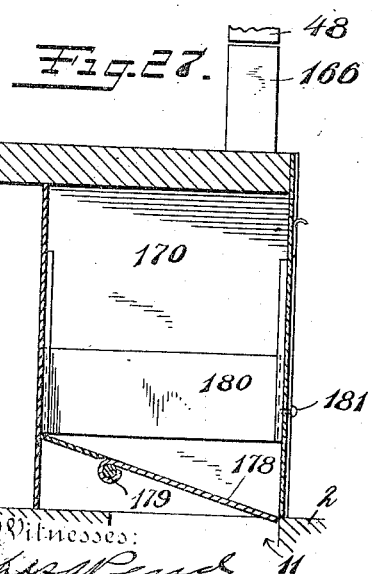
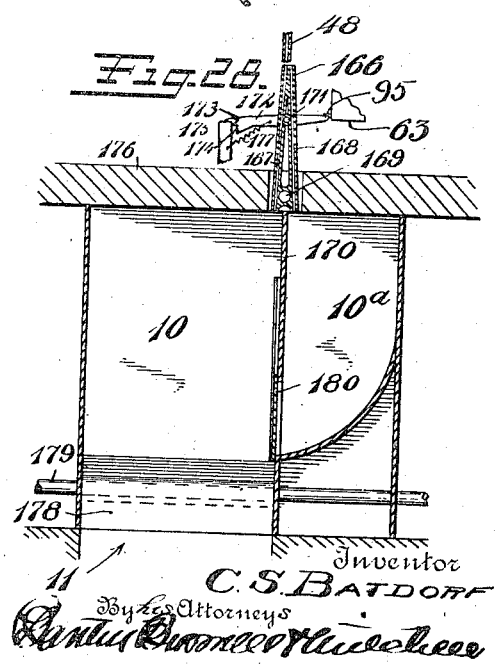
Inventor
C. S. Batdorf C. S. BATDORF.
AUTOMATIC COIN SEPARATING, ADDING, COUNTING, AND BAGGING MACHINE.
APPLICATION FILED AUG. 18, 1909.
1,168,461.
Patented Jan. 18, 1916.
9 SHEETS—SHEET 4.
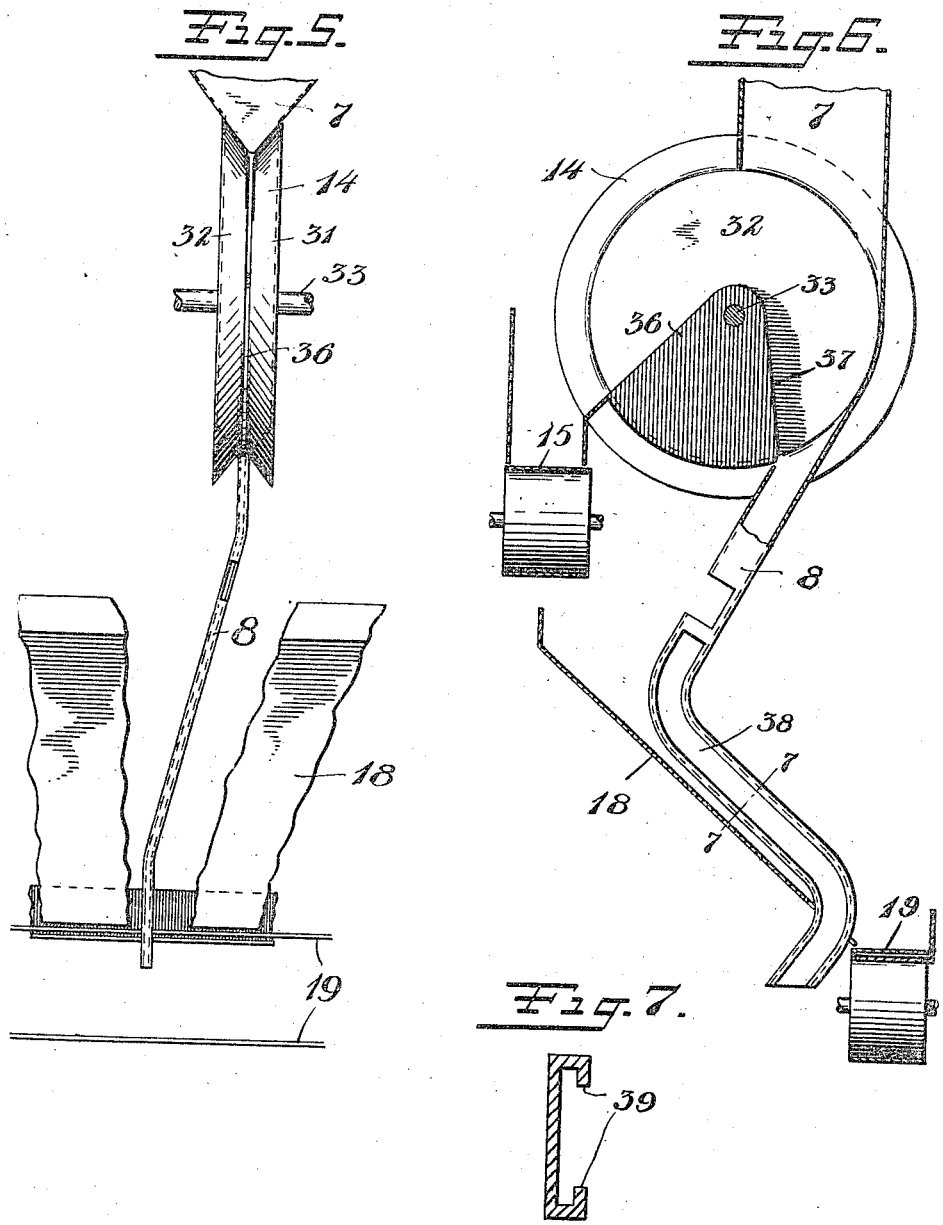

C. S. BATDORF.
AUTOMATIC COIN SEPARATING, ADDING, COUNTING, AND BAGGING MACHINE.
APPLICATION FILED AUG. 18, 1909.
1,168,461.
Patented Jan. 18, 1916.
9 SHEETS—SHEET 5.
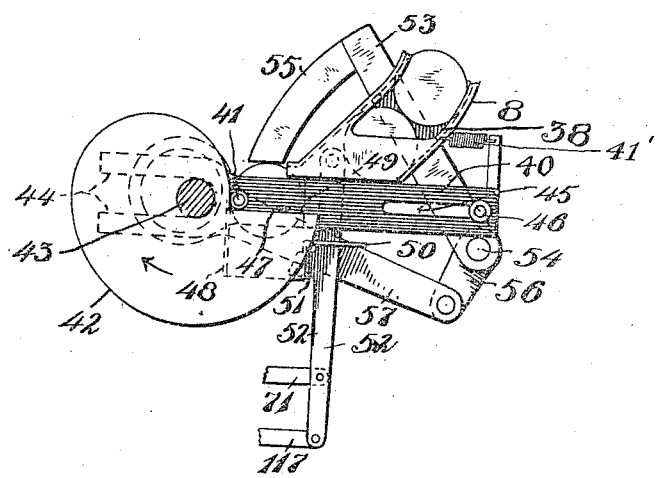
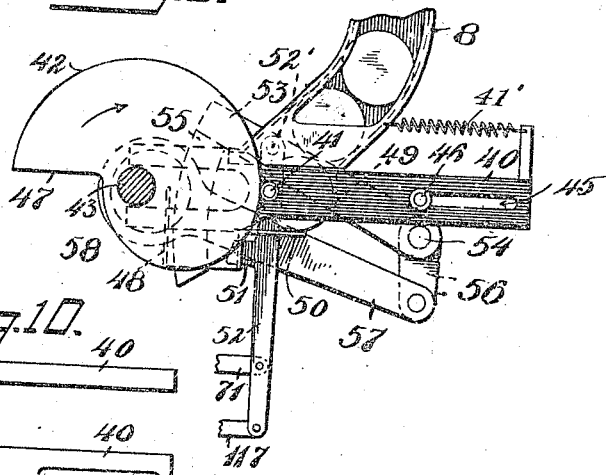
Witnesses:
Inventor
C. S. Batdorf
By his Attorneys

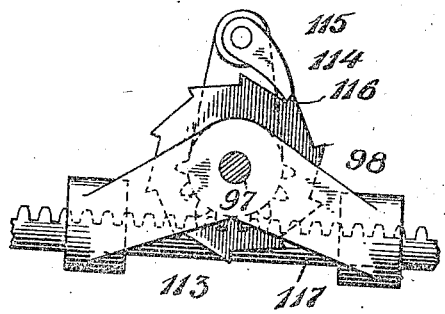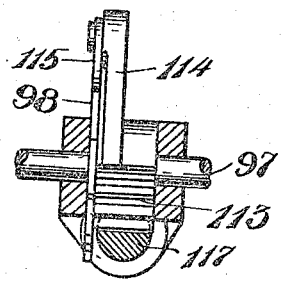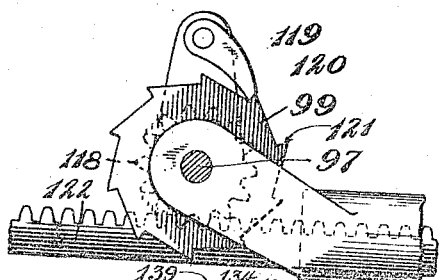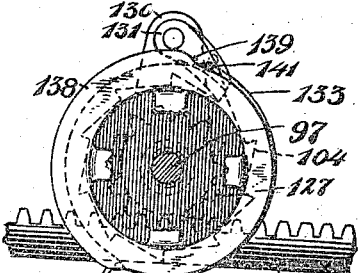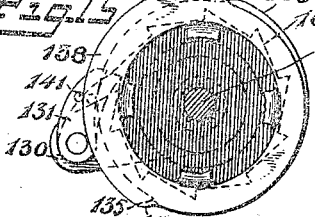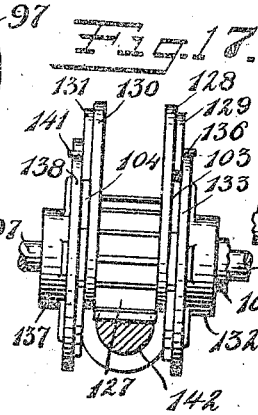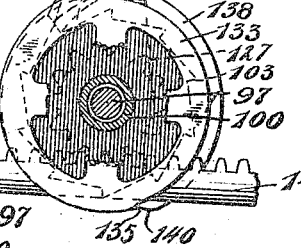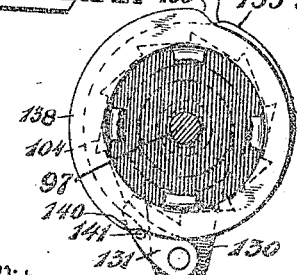

C. S. BATDORF.
AUTOMATIC COIN SEPARATING, ADDING, COUNTING, AND BAGGING MACHINE.
APPLICATION FILED AUG. 18, 1909.
1,168,461.
Patented Jan. 18, 1916.
9 SHEETS—SHEET 7.
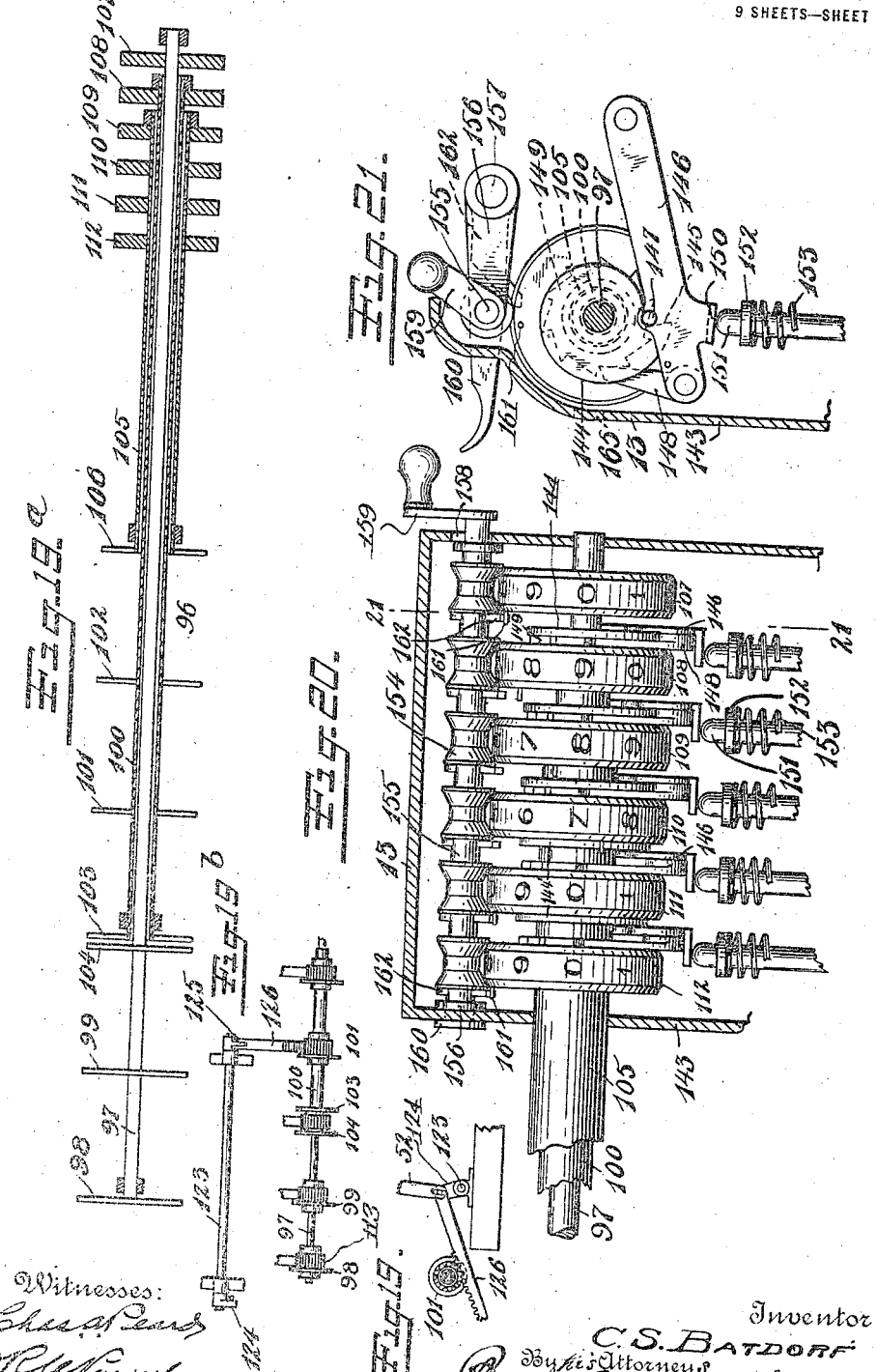
Witnesses:
Inventor
C. S. BATDORF
By his Attorneys

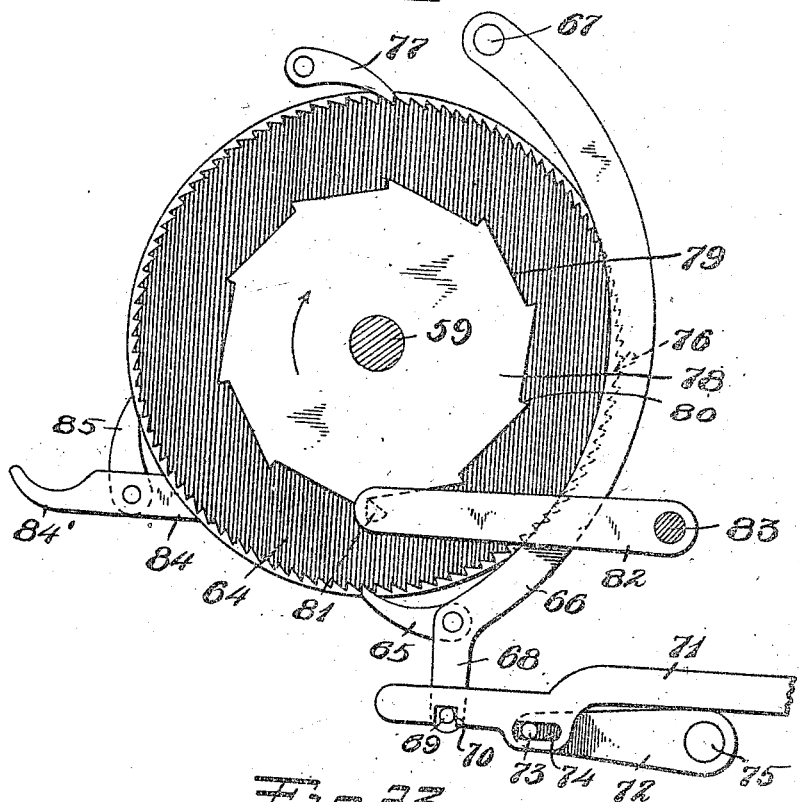
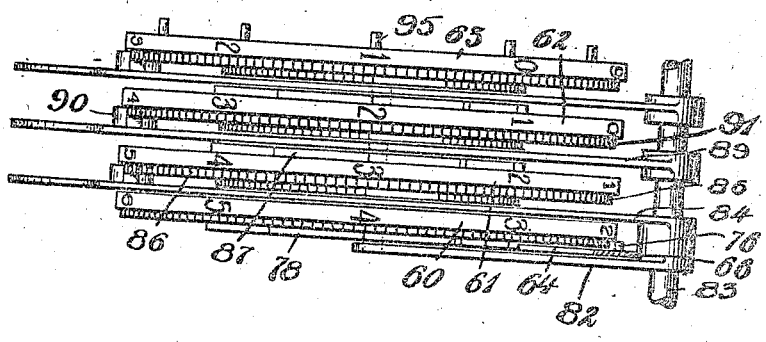

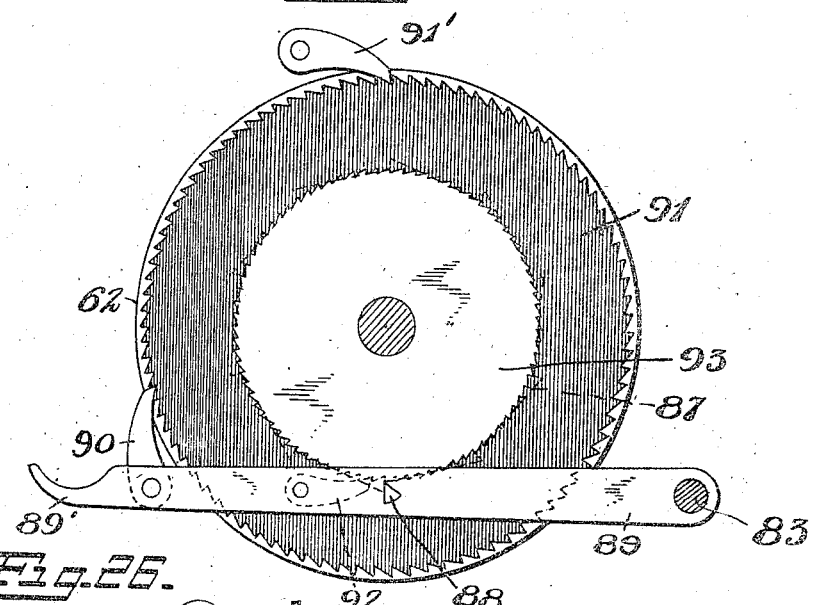
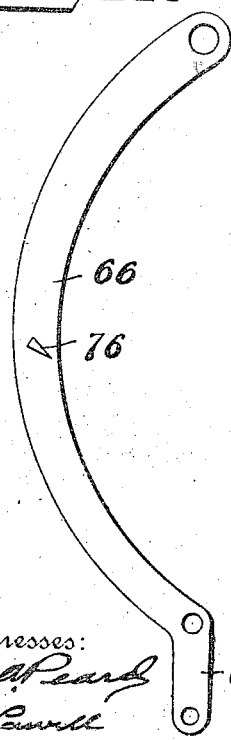
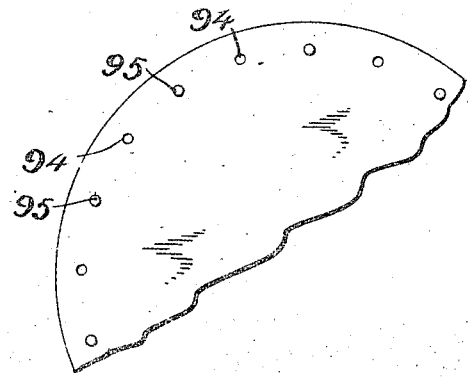

UNITED STATES PATENT OFFICE.

CHARLES S. BATDORF, OF BROOKLYN, NEW YORK, ASSIGNOR, BY DIRECT AND MESNE ASSIGNMENTS, TO AUTOMATIC COINWRAPPING MACHINE COMPANY, OF NEW YORK, N. Y., A CORPORATION OF NEW YORK.

AUTOMATIC COIN SEPARATING, ADDING, COUNTING, AND BAGGING MACHINE.

1,168,461.  Specification of Letters Patent.  Patented Jan. 18, 1916.

Application filed August 18, 1909. Serial No. 513,383.

*To all whom it may concern:*

Be it known that I, CHARLES S. BATDORF, a citizen of the United Sates, residing at Brooklyn, county of Kings, State of New York, have invented certain new and useful Improvements in Automatic Coin Separating, Adding, Counting, and Bagging Machines, of which the following is a full, clear, and exact description.

My invention relates to improvements in coin handling machines and is particularly concerned with a machine which is adapted to sort, separate, add, count and bag or package coins of various sizes, as, for example, all denominations of coins of a given system of currency.

The object of the invention is to provide a machine which will readily handle the coin taken in by street railway systems, banks, department stores and other like institutions which receive large accumulations of coin of different denominations.

With this general object in view, the machine embodying the subject matter of my invention comprises in its general aspects a table upon which the receipts from any of the sources above indicated may be deposited where the operator may readily inspect the same and abstract the paper money, leaving only the various denominations of coin. Conveniently located with respect to this table is a hopper into which the coin may be deposited from the table and in conjunction with which a conveyer operates to carry the coin to a suitably located sorting and distributing apparatus or tray. From the distributing apparatus the coins of different denominations are deposited in separate chutes by which they may be conveyed to suitable mechanism for counting and adding the coin. Interposed in these chutes, I provide means for separating out mutilated or spurious coin and also mechanism for conveying such coin to a suitable receptacle or compartment which may be conveniently termed a rejection box. This box is provided with means whereby the coin therein may be re-deposited on the inspection table or returned to the sorting and distributing means at the will of the operator. Each of these chutes also is provided with means for ejecting coins of less diameter than that for which the particular chute is intended, and means are also provided for conveying such coins back to the sorting and distributing mechanism.

After the coins have passed through and operated the counting and adding mechanism, they are conveyed to convenient receptacles which are each provided with suitable means for segregating given amounts of coin, say, for example, a thousand coins each of predetermined denominations respectively. My invention contemplates also providing these receptacles with suitable means for depositing the coin contained therein in convenient receptacles such as bags and the like, each bag containing a predetermined number of coins of a given denomination, which denomination may be marked thereon. Each receptacle also is so arranged and constructed that the contained coin may be re-deposited on the inspection table for verification or checking.

The invention also includes means for preventing overloading of the delivery from the sorting and distributing mechanism to the counting and adding mechanism, whereby the machine may operate uninterruptedly.

With these objects in view, the invention consists in the construction and arrangement of parts, a preferred embodiment of which is illustrated in the accompanying drawings.

Figure 1 is a front elevation of a machine embodying my invention, parts being in section. Fig. 2 is a side elevation thereof, looking from the right. Fig. 3 is a fragmentary view in plan of the coin separating and distributing tray. Fig. 4 is a sectional view of the parts shown in Fig. 3. Fig. 5 is a fragmentary view in front elevation of the mechanism for delivering coin from the separating and distributing mechanism to the counting and adding mechanism. Fig. 6 is a side elevation part in section of the parts shown in Fig. 5. Fig. 7 is a sectional view on the line 7—7, Fig. 6. Fig. 8 is a detail view of the mechanism for advancing the coin from the delivery mechanism to the counting and adding mechanism. Fig. 9 is a view similar to Fig. 8 showing parts in different position. Fig. 10 comprises edge and plan views respectively of one of the parts shown in Figs. 8 and 9. Fig. 11 is a view in side elevation of the mechanism for actuating the unit shaft of the coin counting mechanism. Fig. 12 is a view of the parts shown in Fig. 11 at right angles to said view, parts being in section. Fig. 13 is a view similar to Fig. 11 showing a different mechanism for actuating the unit shaft for counting five units at one operation to handle nickels of the United States currency. Fig. 14 is a side elevation of the mechanism for operating unit and 10's shafts respectively to register quarter dollars, the shafts being shown in section. Fig. 15 is a view similar to Fig. 14 showing the parts in different position. Fig. 16 is a view similar to Fig. 14 showing the parts in still another position. Fig. 17 is a view of the parts shown in Figs. 14, 15 and 16 at right angles thereto. Fig. 18 is a view of the parts shown in Fig. 14 from the opposite side thereof. Fig. 19 is a diagrammatic view of the coin counting and adding shafts, showing the relative positions of the actuating and counting means thereon. Fig. 19$^a$ is a view of a counter shaft employed in conjunction with the counting and adding shafts shown in Fig. 19 to operate the tens shaft. Fig. 19$^b$ is an end view of parts shown in Fig. 19$^a$. Fig. 20 is an interior view of the coin adding mechanism shown diagrammatically at the right of Fig. 19. Fig. 21 is a sectional view on the line 21—21, Fig. 20. Fig. 22 is a detail view in side elevation of the units wheel of the coin counting mechanism showing the arrangement of the operating parts for actuation of the same and also the connection for conveying motion from the unit's wheel to the 10's wheel. Fig. 23 is a plan view of the registering wheels of one of the coin counting mechanisms showing the operating connections therefor. Fig. 24 is a view similar to Fig. 22 of the 10's, 100's or 1000's wheel of the coin counting mechanism, each of the same being of the same construction as to its operating connection. Fig. 25 is a face view of the 1000's wheel taken from the left hand side of the coin counting mechanism showing the pins for shifting the coin delivery chutes. Fig. 26 comprises plan and edge views respectively of one of the levers for operating the coin counting registering wheels. Fig. 27 is a vertical section from front to rear of one of the main coin receptacles, and Fig. 28 is a similar section at right angles to that of Fig. 27 of one of the main and an adjacent supplementary coin receptacle.

In the embodiment of my invention herein selected for illustration, and referring first for a general description to Figs. 1 and 2, which illustrate the general construction and arrangement of parts of the machine, 1 indicates the side frames of the machine, arranged transversely of which is a coin receiving and inspection table 2. Journaled in said side frames is a power shaft 3 connected with any suitable source of power. Adjacent one end of the table 2 is a hopper 4, within which a conveyer 5 of any suitable construction, operates, which conveyer leads and delivers the coin to a coin separating and distributing mechanism. This separating and distributing mechanism comprises in the main a tray 6 having a series of sets of transversely arranged apertures, the apertures of each set increasing in diameter from the upper end to the lower end of the tray, and those of each set respectively being adapted to pass coins of successively increasing diameter as hereinafter to be more fully described. Beneath the separating and distributing tray, and registering with the divisions thereof respectively, is a series of hoppers 7—7′—7$^2$—7$^3$—7$^4$—7$^5$, and from each of said hoppers coin chutes 8—8′—8$^2$—8$^3$—8$^4$—8$^5$ respectively lead to coin counting mechanisms 9—9′—9$^2$—9$^3$—9$^4$—9$^5$ respectively for the coins of each denomination. Beneath these separate coin counting mechanisms also are arranged coin receptacles 10—10′—10$^2$—10$^3$—10$^4$—10$^5$ respectively, into which the coin from the counting mechanisms is delivered, and each of said receptacles also is provided at the bottom with a delivery chute as indicated at 11, Fig. 2, provided with hooks or other suitable fastenings to receive and hold a bag or other suitable receptacle for the coin delivered from each of said coin receptacles. Adjacent each of said coin receptacles 10—10′ etc., are arranged supplementary receptacles 10$^a$—10$^b$—10$^c$—10$^d$—10$^e$—10$^f$ respectively and the mechanism for delivering coin to said receptacles 10—10′, etc., is so arranged as to interrupt the feed after a predetermined number of coins have been delivered thereto, and to feed any coin in excess of such predetermined number directly into said supplementary receptacles 10—10$^a$—10$^b$, etc. Each of the receptacles 10—10′, etc., also is provided with means hereinafter to be described for redelivering the coin therein to the receiving and inspection table 2, whereby the amounts of coin in each receptacle may be re-inspected and verified. Operatively connected with the various coin counting mechanisms is a coin adding mechanism indicated generally at 13, Figs. 1 and 2, by which the total amount represented by the coin passing through each of the coin counting mechanisms is added together and the amount indicated by suitable indicator or register wheels to be hereinafter described.

Interposed in each of the coin delivery chutes 8—8′, etc., which convey the coin from the hoppers 7—7′, etc., to the counting mechanism, is a coin ejecting mechanism indicated generally at 14—14′—14$^2$—14$^3$—14$^4$—14$^5$ hereinafter to be more particularly described, which is so constructed and arranged as to permit the passage of coins of a given thickness through the chutes 8—8', etc., to the counting mechanisms respectively, but will eject mutilated coin or coin of a greater thickness from said path. Adjacent said ejecting mechanisms is arranged a conveyer comprising preferably a conveyer belt 15 carried by pulleys 15', one of which may be a driving pulley connected in any suitable manner with driving shaft 3, which serves to convey the ejected coins from said ejecting mechanism to a suitable receptacle such as 16, Fig. 1, which may be conveniently termed a rejection box, and beneath said box is arranged a suitable chute or guide 17, by which said rejected coin may be returned to the hopper 4 and re-deposited upon the separating and distributing mechanism 6 by the conveyer 5. Each of the delivery chutes 8—8', etc., is provided with means for ejecting coin of less diameter than that for which each chute is intended respectively, and adjacent said chutes is arranged a hopper 18, Fig. 2, which extends continuously transversely of the machine and delivers such coin to a conveyer indicated generally at 19, operating transversely at the rear of the machine and provided with a chute 19' for re-delivery of such coin also to the hopper 4, whereby it may be re-deposited upon the separating and distributing mechanism by the conveyer 5.

Having now outlined the general structure and arrangement of parts of the machine, I will proceed to a detailed description of said parts in the order in which they are involved in the operation of handling the coin.

The inspection table 2 is conveniently arranged transversely at the front of the machine and just in front of the coin receptacles 10—10', etc., upon which table accumulations of currency received from any of the sources above indicated may be deposited, whereupon the operator separates out the paper money, leaving only the various denominations of coin to be separated, distributed and separately counted and the total amount added together. Thereupon the operator may readily sweep the coin through a suitable aperture in table 2 into the hopper 4, from which it is conveyed by the conveyer 5 to and deposited upon the upper end of the coin separating and distributing tray 6. The conveyer 5 may consist of an ordinary belt conveyer having a series of transverse strips or coin carriers 5ª attached thereto, which belt passes around a pulley 5' on the power shaft 3, Fig. 2 and at its upper end about a suitable idler pulley 20. The hopper 4 has an extension 4ª of substantially the same width as the conveyer 5, and which is spaced from the conveyer just sufficiently to permit the passage of carriers 5ª. The coins in hopper 4 slip down the extension 4ª and thus become seated edgewise on the carriers 5ª, lying flat against conveyer belt 5. A suitable shield 21 may be located adjacent the conveying side of the conveyer 5, having a guide-plate 22, Fig. 2, located near the upper end thereof, which lies closely adjacent the conveyer belt and serves to arrange the coins on the conveyer carrier for proper delivery to the separating and distributing tray 6.

*Separating and distributing mechanism.*— The form of this mechanism here selected for illustration consists of an inclined tray 6, preferably of sheet metal, suitably supported at its upper end in the side frame 1 and supported at its lower end preferably by means of rods 23 slidingly mounted in the adjacent side frame 1, having thereon springs 24 interposed between the end of the tray and the side frame and at the upper end of the tray is secured a cam arm 25 having a cam end 26 adapted to be engaged by cam projections 27 on the inner side of the idler pulley 20 of conveyer 5, whereby, upon rotation of said pulley, the separating and distributing tray 6 will be agitated longitudinally against the pressure of the springs 24 to facilitate and accelerate the passage of the coin over said tray.

Arranged transversely of the bottom of the tray 6, Fig. 3, are a plurality of sets of apertures 28—28'—28², etc., the apertures of each set corresponding to the different diameters of the various coins, for example, of a given system of currency, from the smallest to the largest so that as said coins travel lengthwise of the tray, the coins adapted to fit said apertures will fall successively through the apertures intended therefor. The bottom of the tray furthermore is provided with a series of steps 29, etc., each of which is located substantially at the longitudinal center of each of said sets of apertures whereby any coins which have become superposed upon others will be sufficiently displaced to reach the apertures intended for their delivery. The hoppers 7—7', etc., beneath said tray are provided with dividing walls 30—30', etc., arranged transversely beneath the divisions between said sets of apertures 28—28', etc., whereby the coins of each diameter or denomination will be properly conducted to its corresponding delivery chute 8—8', etc. Adjacent the opposite sides of each of said delivery chutes 8—8', etc., is located a coin ejecting mechanism 14—14', etc. As the construction and operation of each of these ejecting mechanisms is the same, a description of one will suffice for all. Each of said ejecting mechanisms comprises a pair of parallel disks 31—32, Figs. 5 and 6, which are fixed for rotation upon a shaft 33 extending transversely of the machine and journaled in the side frames 1 thereof, and provided with a pulley 34, Fig. 1, connected by a belt 35 with the power shaft 3. The disks 31—32 are spaced apart just sufficiently to permit the free passage of a coin of predetermined thickness, as for example, the thickness of a perfect coin. Bent or mutilated coins, or coins of excessive thickness, will be caught between said disks and carried out of the chute or coin path 8 leading to the corresponding counting mechanism. Between the disks 31 and 32, moreover, is located a stationary deflector plate 36, Fig. 6, which serves to expel the coins held thereby and to deposit them upon the conveyer 15, by which they are conveyed to and deposited in the rejection box 16, Fig. 1. The rear edge 37 of said ejector plate 36 forms a continuation of the front wall of the coin delivery chute 8.

The ejector mechanism serves the further function also of agitating the coins within the delivery chute 8, whereby jamming or arching of the same is prevented, and furthermore, should the chute become overloaded with coin, the excess of coin will be carried out of the coin chute by ejector mechanism 14 and depositetd by the conveyer 15 in the rejection box 16. It will be seen, therefore, that the ejector mechanism accomplishes a two-fold function of ejecting objectionable coin from the delivery chute 8 and also relieving said chute of overloading.

By means of the coin separating and distributing mechanism thus far described, it will be seen that the coins are first measured and separated according to differences in their diameters by the apertures in the separating tray 6 and are afterward again measured according to their thickness by means of the ejector mechanism 14; hence the danger of coin of the wrong denomination gaining access to one of the delivery chutes for which it is intended is in a great measure eliminated.

In order to further insure the accurate separation and distribution of the coin, particularly in cases where coin has been accidentally carried beyond the apertures in the coin distributer 6 intended to receive the same, the chutes 8 are provided with means for ejecting coin of less diameter than that for which they are intended. For this purpose, as will be seen from an inspection of Fig. 5, each of the coin chutes is laterally inclined for a considerable portion of its length below the ejector mechanism 14 and at the lower side of such inclined portion is provided an opening 38, the edges 39 of said opening, Fig. 7, being sufficiently close together to retain a coin of the proper diameter within the chute, but being sufficiently apart to cause a coin of less diameter to drop out of the chute owing to the inclination thereof. Hence, during the transit from the separating and distributing mecha-nism 6 to the counting mechanisms 9, all misplaced coins will be effectually eliminated.

Extending transversely of the machine and beneath the inclined portions of the chutes 8 is arranged a hopper or guide-way 18, by which coins ejected through the openings 38 will be guided to and deposited upon the conveyer 19. By this conveyer such coins are carried to the chute 19' by which they are re-deposited in the hopper 4 and thence conveyed to and deposited upon the separating and distributing mechanism 6 by the conveyer 5, where they will be redeposited in their proper delivery chutes and carried to their corresponding counting mechanisms.

*Coin counting mechanism.*—Arranged transversely of the machine and adjacent to the lower ends of the chutes 8, 8', etc., are the several coin counting mechanisms indicated at 9, 9', etc., Fig. 1, which are constructed and arranged to separately count the coin from each of said chutes 8, 8', etc. For this purpose I provide a coin advancer 40, Figs. 8 and 9, which is actuated transversely beneath the bottom of each chute, said advancer is provided with a cam roll 41 adapted to engage a spiral cam 42 upon a rotating shaft 43, arranged transversely of the machine and operated from power shaft 3, and said advancer is also provided with a guide fork 44, supported by said shaft 43 and at its rear end with a slot 45, engaging a guide pin 46 conveniently supported upon the machine frame. The cam roll 41 is held in engagement with the cam 42 by any suitable form of spring as for example a spiral spring (not shown) extending between advancer 40 and adjacent chute 8, and as said roll 41 drops off of the shoulder 47 of said cam 42 the advancer will be moved forward by said spring to carry the lowest coin from the delivery chute 8 to a second chute 48 supported by chute 8 by which it is further advanced to the counting mechanism. To properly advance the coin from chute 8 to chute 48, the advancer 40 is provided with a shoulder 49, which, when the advancer is in its rearmost position, lies just to the rear of the chute 8 and below the advancer is a stop or rest 50 to support the coin when lying in the path of the advancer shoulder 49. The second chute 48 is provided with means by which the coin operates the coin counting mechanism during its passage therethrough. The forward movement of the advancer carries the coin into alinement with the second chute 48, into one side of which projects a lug 51 attached to a lever 52, pivoted at 52', which in turn is connected with suitable mechanism, hereinafter to be described, for operating the coin counting and adding mechanisms. To force the coin through the chute 48 past the lug 51 and thereby actuate the lever 52, a rocker arm 53 fixed upon a transverse rock shaft 54 is provided having at its free end a pusher finger 55 adapted to descend upon the coin in the chute 48 and advance the coin therethrough. To actuate said rocker arm 53, the rock shaft has fixed thereto an arm 56 connected by an eccentric rod 57 with an eccentric 58 on the shaft 43. By the mechanism just described, the passage of each coin over the lug 51 serves to actuate the lever 52 and through it the counting and adding mechanisms by means of connections which will be described in connection with the description of said mechanisms.

It is to be understood that a coin advancing mechanism, such as just described, is provided at the bottom of each of the chutes 8, 8', etc. The several counting mechanisms indicated at 9, 9', etc., Fig. 1, are arranged upon a fixed transverse shaft 59. As shown in Fig. 23, each of said coin counting mechanisms comprises in general a plurality, for example, four counting and registering disks 60, 61, 62 and 63 for registering amounts from 1 to 10,000. Fixed to the units wheel 60 is a ratchet wheel 64 adapted to be engaged by a pawl 65, pivoted to a lever 66, which in turn is suitably pivoted upon a shaft 67, extending transversely of the machine. Said lever 66 has an extension 68, carrying a pin 69, which engages a slot 70 in an actuating rod 71, which is pivoted at its opposite end to the lever 52, Fig. 9, connected with the coin advancing mechanism. To disengage the lever 71 from the lever 66, when desired, a rock arm 72 is provided, having a pin 73 engaging a slot 74 in said lever 71, said rock arm 72 being fixed to a shaft 75 extending transversely of the machine and having a crank or any suitable handle to facilitate actuation thereof to simultaneously disengage the levers 71 of each of the counting mechanisms from the carrying lever 66, when it is desired to throw the coin counting mechanism out of operation. The lever 66 is also provided with a suitable tooth 76 arranged to engage the teeth of the ratchet wheel 64 to prevent reverse movement thereof and for still greater prevention of such reverse movement a spring pawl 77 is also arranged to engage the teeth of said ratchet wheel 64. Fixed to the units ratchet wheel 64 is a cam wheel 78 having a series of cam surfaces 79 thereon terminating in abrupt shoulders 80. Engaging the cam wheel 78 is a tooth 81 fixed to a swinging arm 82, pivoted upon a suitably located shaft 83 and extending from the hub of the arm 82 is a second arm 84 which projects between the units wheel 60 and the 10's wheel 61 and is provided at its outer end with a spring pawl 85 arranged to engage a ratchet wheel 86 fixed to the 10's wheel. A suitable spring (not shown) supporting levers 82 and 84 causes engagement of these levers with the adjacent cam and ratchet wheels respectively. The length of each of the cam surfaces 79 of the cam wheel 78 is such that when the pawl 65 on lever 66 has actuated said units wheel for ten teeth, the tooth 81 on the lever 82 will drop off one of the cam shoulders 80 of said cam wheel 78, whereupon the lever 84 through its pawl 85 will actuate the 10's wheel for one tooth.

The 10's wheel 61 carries on its face adjacent the 100's wheel 62 a cam wheel 87 similar to the cam wheel 78 on the units wheel, which is engaged by a tooth 88 on a lever 89, Fig. 24, likewise freely pivoted upon the shaft 83. This lever 89 between the 10's and 100's wheel is also provided with a pawl 90 arranged to engage a ratchet wheel 91 on the 100's wheel 62. In this case also when the 10's wheel 61 has been actuated for ten spaces, the tooth 88 will drop off one of the cam shoulders of the cam wheel 87 and cause the pawl 90 to actuate the 100's wheel one space. The 10's, 100's and 1,000's wheels also are provided with stop pawls to prevent reverse movement thereof and each of the levers between said wheels may likewise be provided with pawls 92 to engage ratchet wheels 93 fixed to said registering wheels. The construction of the actuating lever and cam wheel for the 1000's wheel being the same as that heretofore described for the 100's wheel, no further description thereof is necessary. The levers 84 and 89 may be provided with finger pieces 84' or 89' respectively whereby the counting wheels actuated thereby may be manually turned to zero when desired. Likewise the units wheel may be similarly operated by disengaging lever 66 from rod 71 and then manually operating said lever 66. The outer face of the 1000's wheel, as indicated in Figs. 23 and 25, is provided with a series of sockets 94, adapted to receive pins 95, Figs. 23 and 25, to actuate the coin delivery mechanism to the receptacles 10, 10', etc. and 10ª, 10ᵇ, etc. as hereinafter described.

From the above description it will be seen that the coins delivered from each of the coin chutes 8, 8', etc., are separately counted and registered.

Having now described the manner in which the coins are separated, distributed and separately counted, I will now proceed to describe the mechanism by which the total amount represented by the coins passing through the several counting mechanisms are added together and registered.

*Coin adding mechanism.*—Simultaneously with the operation of each of the coin counting mechanisms above described a coin adding mechanism is brought into operation. For this purpose I provide a plurality of transverse concentric shafts indicated in general at 96, Fig. 1, and diagrammatically in Figs. 19 and 19ª and comprising a units shaft 97 and a ratchet wheel 98 fixed thereon for registering pennies of United States currency, for example, and a second ratchet wheel 99 for registering nickels, said ratchet wheels being operatively connected with the coin advancing mechanism whereby they may be properly actuated by the passage of each coin therethrough. Concentric with the shaft 97 is a shaft 100 having fixed thereto a ratchet wheel 101 for registering dimes and a second ratchet wheel 102 for registering half dollars. Also fixed to the shaft 100, which I conveniently designate as the 10's shaft is a third ratchet wheel 103 which coöperates with a ratchet wheel 104 fixed to the units shaft for the registration of quarter dollars in a manner hereinafter to be described.

Concentrically mounted upon the shaft 100 is a third shaft 105 having fixed thereto a ratchet wheel 106 for registration of dollars. On the end of the units shaft opposite the ratchet wheel 98 is fixed a registering wheel 107 and on the corresponding adjacent end of the 10's shaft is fixed a registering wheel 108. Likewise on the adjacent end of the 100's shaft is fixed a registering wheel 109. Also loosely mounted on shaft 105 are registering wheels 110, 111 and 112, which together with the wheels 107, 108 and 109 form the recording register of the counting mechanism.

Referring now to Fig. 11, which shows the construction and arrangement of the mechanism for actuating the units shaft by the passage of pennies through its corresponding coin advancing mechanism, 113 indicates a pinion rotatably mounted upon the units shaft 97 and carrying a ratchet arm 114 provided with a pawl 115, which engages the teeth 116 of the units ratchet wheel 98, shown to the left of Fig. 19. Engaging the pinion 113 is a rack 117 which is connected for actuation to the lever 52, Figs. 8 and 9, of the units coin counting mechanism 9', Fig. 1, whereby said pawl 115 will rotate said ratchet wheel 98 upon the passage of a coin through the corresponding units coin chute 48, Figs. 8 and 9, and the distance of connection of the rack 117 with said lever 52 from the fulcrum of said lever is made such that the units ratchet 98 will be actuated one tooth upon the passage of each coin, whereupon the units shaft will be given one-tenth of a revolution. As will be seen from an inspection of Figs. 19 and 20, this rotation of the units shaft 97 will impart corresponding rotation to the registering wheel 107 upon the opposite end thereof, whereby the passage of each coin will be recorded in the coin counting register.

For the registration of nickels a second ratchet wheel 99, Figs. 13 and 19, is provided on the units shaft 97 and adjacent said wheel a pinion 118 is rotatably mounted on said shaft, carrying a ratchet arm 119 provided with a pawl 120 for engagement of the teeth 121 on said ratchet wheel 99. For actuation of the parts just described a rack 122 engages the pinion 118 and is likewise connected with a lever corresponding to lever 52, Fig. 9, of the coin advancing mechanism at the bottom of the nickels chute 8², Fig. 1. The construction and arrangement of this connection between the rack 122 and the lever 52 will be a duplicate of the construction and arrangement shown in Fig. 9 between the lever 52 and the rack 117. Connection between said rack 122 and lever 52 is made at such distance from the fulcrum of said lever that the ratchet wheel 99 will be actuated for five teeth by the pawl 120 by the passage of a coin through the nickels coin advancing mechanism and a corresponding degree of rotation will be imparted to the units shaft and will be recorded in the adding register 13, Figs. 1 and 20 by the units registering wheel 107. The registering of nickels therefore in the adding mechanism is accomplished without excessive rotation of the unit shaft.

As will be seen from an inspection of Fig. 1, the delivery chute 8, which conveys the dimes from the separating and distributing mechanism to the adding and counting mechanism, is located well to the left hand side of the machine. It has been found inexpedient, however, in practice to register dimes by means of the unit shaft owing to the necessity of an excessive degree of rotation of said shaft to accomplish such registration. I therefore provide a so-called tens shaft 100 concentric with the unit shaft and terminating considerably within the left hand end of said unit shaft in order not to interfere with the operation of the latter. This arrangement of the tens shaft, furthermore, provides for convenient registration of quarter dollars in conjunction with the unit shaft in a manner hereinafter to be described.

In order to provide for operative connection between the coin advancing mechanism at the bottom of the chute 8, which delivers the dimes from the separating and distributing mechanism, I provide a rock shaft 123, Fig. 19ᵇ, provided with a rocker arm 124 adapted to engage a lever corresponding to the lever 52 of the coin advancing mechanism illustrated in Fig. 9. At the opposite end of said shaft is the rocker arm 125 arranged to actuate a rack 126 adapted to actuate the ratchet wheel 101 on the ten shaft 100, diagrammatically shown in Figs. 19 and 19ª. Inasmuch as the operative connections between the rack 126 and the ratchet wheel 101 are the same in all respects as those shown in Fig. 11 and dethe registering wheel 108, whereby one unit of said wheel is registered.

Mechanism similar to that just described is likewise provided between the wheels 108 and 109, 109 and 110. The wheels 110, 111 and 112 however are loose on the shaft 105 and in order that the adding operation may be properly carried successively to the registering wheels 111 and 112, a cam 144' corresponding to cam 144 heretofore described is carried by the left hand face of wheel 110, Fig. 20 and the lever 146 extends between cam 144' and the ratchet wheel 149 on registering wheel 111. In other respects the construction and mode of operation of these parts is the same as that heretofore described for registering wheels 107, 108 and 109. The actuating mechanism between registering wheels 111 and 112 being the same as that between 110 and 111, no further description thereof is necessary. By the mechanism just described the amounts represented by the coins will be properly carried from one registering wheel to another, thus registering and indicating the total amount represented by all of the coins upon which the machine operates by means of proper numerals upon the peripheries of the several registering wheels. When the machine is employed to operate upon United States currency, the wheels 107, 108 and 109 will record pennies, dimes and dollars respectively and the wheels 110, 111 and 112 respectively will serve to add and record tens, hundreds and thousands of dollars respectively, the registering mechanism here illustrated being capable of actually registering $9999.99, practically $10,000.

In case it should be desirable to return the registering mechanism to zero before the full capacity thereof has been registered, I provide means adjacent the registering wheels above described for manually turning the same independent of the coin register actuating mechanism. To this end, I mount a plurality of friction wheels 154 upon a shaft 155, which is carried by the rock arms 156 mounted on a rock shaft 157 journaled in the ends of the box 143. A suitable coiled spring in the shaft 157 normally holds said friction wheels free of the registering wheels. One end of said shaft 155 projects through a slot 158 in casing 143 and is provided with a crank handle 159. Rock shaft 157 is provided with a finger lever 160 by which the friction wheels 154 may be depressed into contact with the registering wheels, whereupon by rotating the shaft 155 the registering wheels may be turned back to zero.

In order that each of the wheels 107, 108, etc., may be brought to the zero point by the manually operable friction wheels 154 irrespective of the position in which any of said registering wheels may stand, each of said wheels is provided with a stop pin 161, Figs. 20 and 21, adapted to engage one of a series of stop arms 162, also fixed to the rock shaft 157. When the friction wheels 154 are depressed into contact with the registering wheels, the stop arms 162 are simultaneously lowered into the path of the pins 161, whereupon when the friction wheels 154 are rotated by the crank arm 158, each of said registering wheels will be rotated until the stop pins 161 are brought up against the stop arms 162, at which point the zero mark on each of the wheels will be brought opposite an observation opening 165 in the casing 143. In case further rotation of the friction wheels 154 be necessary to bring any of said registering wheels to the zero point, the particular friction wheel in contact with the registering wheel or wheels already so positioned will merely slip upon the latter, due to engagement of the pin 161 with the stop arm 162. After all the registering wheels have been properly positioned at zero, the lever 160 may be released to remove the stop arms 162 out of the paths of the pins 161, thereby placing the registering mechanism in condition for operation by the coin advancing mechanism, as heretofore described.

To avoid injury of the registering wheels 107, 108, etc., by the friction wheels 154, the latter are provided with oppositely beveled faces which engage correspondingly beveled edges of said registering wheels.

*Bagging mechanism.*—After the coins have been separated and distributed, counted and added as above described, it is desirable that the same may be placed in predetermined quantities in bags or other like receptacles for storage and the like. To this end after the coin is passed through the second chute 48 at the bottom of each chute 8, 8', etc., and has actuated the counting and adding mechanism through the lever 52 as above described, it is received within one of the members of a duplex chute 166, Figs. 27 and 28, by which it is delivered either into one of the receptacles 10, 10', etc., in a manner to be now described.

The duplex chute 166, consists of a passage 167 adapted to deliver to a main receptacle as 10, for example, and a supplementary passage 168 adapted to deliver to a supplementary receptacle as 10ª, for example. The two chutes 167 and 168 are secured together and pivoted at the point 169 just over the dividing wall 170 separating said receptacles 10 and 10ª. Also pivoted at 171 to the duplex chute is a lever 172 having stop shoulders 173 and 174 respectively arranged to engage a stop 175 projecting from the plate 176 which extends over the several receptacles. The stop shoulders 173 or 174 of the lever 172 are held in engagement with said stop 175 by scribed for the unit ratchet wheel, further description thereof will be unnecessary. Likewise the operative connections between the coin advancing mechanism located beneath the chute 8⁴ for conveying half dollars from the separating and distributing mechanism to its corresponding counting and adding mechanism and the ratchet wheel 102 on the tens shaft 100 is the same in all respects as that described for the operation of the nickel registering ratchet wheel 99, further description thereof is unnecessary.

It is to be understood, however, that the passage of each dime through its coin advancing mechanism actuates the shaft 100 and consequently the adding and registering wheel 108 mounted thereon for one space, thereby registering said coin in the adding mechanism, but as in the case of the operation of the unit shaft by the nickels ratchet wheel 99, so also a similar mechanism is provided whereby the half dollar ratchet wheel 102 will actuate the tens shaft and consequently the registering wheel 108 of the adding mechanism for five spaces.

In order to register quarters, mechanism is provided for coöperatively operating the unit shaft to register the five units thereof and the ten shafts for registering the two tens thereof. For this purpose the unit shaft 97 is provided with a ratchet wheel 104 which is located closely adjacent to a corresponding ratchet wheel 103 on the adjacent end of the tens shaft Fig. 19.

Between the ratchet wheels 103 and 104, Fig. 17, a pinion 127 is loosely mounted upon the unit shaft 97, said pinion carrying a ratchet arm 128, provided with a pawl 129, which engages the ratchet wheel 103 on the tens shaft. Likewise upon the opposite side of said pinion is a ratchet arm 130 carrying a pawl 131 engaging the ratchet wheel 104 on the unit shaft. Fixed to a bearing 132 of the tens shaft is a cam disk 133, having at its edge cam shoulders 134 and 135 respectively, said cam serving to engage a pin 136, Fig. 18, on the pawl 129 which operates the ratchet 103 of the tens shaft 100. Likewise fixed to a bearing 137 for the unit shaft 97 is a cam disk 138 provided with shoulders 139 and 140 respectively, said cam arranged to engage a pin 141 on the pawl 131, which actuates the ratchet wheel 104 on the unit shaft 97. The arrangement of the shoulders of these cams is such that upon initial actuation of the pawl arms 128 and 130, the pawl 131 will engage the ratchet wheel 104 and rotate the unit shaft for the space of five teeth, thereby registering on the unit wheel of the adding register the five units of the quarter dollar, thereupon the pawl 131 will be freed from its ratchet wheel 104 by the cam 130 and simultaneously the pawl 129, which heretofore has been kept out of engagement with its ratchet 123 by the cam 128, will be permitted to engage said ratchet wheel 103 and move the same to the extent of two teeth, thereby registering the two tens of the quarter dollar by means of the tens wheel in the coin adding register. To actuate the pinion 127, a rack 142 is provided similar in all respects to the racks 17 and 122 heretofore described and likewise connected with a lever corresponding to the lever 52 of the coin advancing mechanism located beneath the chute 8³, Fig. 1, for delivering coin from the coin separating and distributing mechanism.

Fig. 14 indicates the initial position of the pawls before the same have been actuated.

Fig. 16 illustrates the position of the pawls at the point where the pawl 131 is released from the unit ratchet wheel 104 and the pawl 129 is brought into engagement with the tens ratchet wheel 103.

Fig. 15 illustrates the position of the parts at the completion of the registering operation.

The construction and operation of the mechanism for actuating the ratchet wheel 106 Fig. 19 for registering dollars, for example, being the same in all respects as that described for the actuation of the unit wheel 98 and tens wheel 101, further description thereof is unncessary.

Having described the mechanism for actuating the coin adding mechanism, I will now describe in detail the construction and arrangement of parts of the adding register illustrated in Figs. 20 and 21. The same consists in general of a casing 143 which incloses the several registering wheels 107 to 112 inclusive. In order to carry the addition of coins of a given denomination to the registering wheel of the next higher denomination, the following mechanism is provided.

Referring to Figs. 20 and 21 the units shaft 97 has fixed thereto to the left of the units wheel 107 as viewed in said Fig. 20, a cam disk 144 having a spiral cam edge terminating in an abrupt shoulder 145, Fig. 21, and between said cam and said registering wheel 107 extends a ratchet lever 146 having a cam pin 147 arranged to engage the spiral cam 144 and also having a pawl 148 which engages the teeth of a ratchet wheel 149 on the adjacent registering wheel 108. Said ratchet lever 146 is provided with a bearing 150 engaged by a pin 151 supported in lugs 152 within the casing 143, which pin, by means of a spring 153, holds the cam pin 147 on lever 146 in contact with cam 144. When the units shaft 97 is rotated through one complete cycle, the cam pin 147 drops off the cam shoulder 145 and causes the pawl 148 to actuate the ratchet wheel 149 for the space of one tooth, thereby imparting a corresponding movement to means of a spring 177 and the opposite end of said lever lies in the path of the pins 95, Fig. 23, of the wheel 63 of the coin counting mechanism for counting the coins to be delivered to the particular receptacle as 10, whereby as one of said pins 95 passes over the lever 172, the latter will be tripped to permit the chute 168 of the duplex chute 166 to swing into alinement with the chute 48, whereupon the coins which thereafter pass through the chute 48 will be delivered to the supplementary receptacle 10ª. The pins 95 may be so arranged upon the counting wheel 63 as to effect such shifting of the duplex chute 66 after any predetermined number of coins have been delivered to the receptacle 10, whereupon any coins in excess of such predetermined number will thereafter be delivered to the supplementary receptacle 10ª. The arrangement of the pins 95 here illustrated will serve to effect such shifting of the duplex chute after one thousand coins have been delivered to the receptacle 10. By increasing or decreasing the number of pins, however, this number may be decreased or increased, as desired.

Each of the receptacles, such as 10, 10', etc., is provided at its bottom with a swinging door 178, Fig. 27, mounted upon a rock shaft 179 extending transversely of the machine and provided at any convenient point with a handle or lever by which the several doors 178 of each receptacle may be opened to deliver the coin contained in the corresponding receptacle to the chutes 11, Figs. 1 and 27, whereby the coin in predetermined quantities may be delivered to bags or receptacles hung upon the supporting members 12, Fig. 2, whereupon it may be removed from the machine.

In case the amount of coin of any particular denomination exceeds the predetermined amount to be contained in each bag or other like receptacle, the excess coin will by the shifting of the duplex chute, as above described, be delivered to the adjacent supplementary chambers 10ª, whereby the segregation of given amounts of coin may be effected without interrupting the operation of the machine until the entire amount of coin to be counted, added and bagged has passed through the counting and adding mechanism. The excess coin in the supplementary receptacle 10ª may then be disposed of as desired. To deliver the latter from the machine the supplementary chamber is provided with a sliding door 180 provided with a handle 181 by which it may be manipulated by the operator to deliver the coins from the supplementary receptacle to the coin receptacle 10. Furthermore, each of the main receptacles as 10 is provided with a sliding door 181, Fig. 1, by which coin from each of said chambers may be redeposited upon the coin receiving and inspection table 2, in case it should be desirable to recount the coins of any denomination for the purpose of verification or checking.

Should the number of coins of a given denomination to be counted amount to several times the predetermined number it is desired to segregate the operator may by operating the door 178 discharge the main chamber 10 and thereupon manually trip the lever 172 to continue delivering into the receptacle 10 and by manipulating the door 180 discharge the coins which in the meantime have collected in the receptacle 10ª also into the receptacle 10, whereupon when the lever 172 is next tripped by the succeeding pin 95 the receptacle 10 will have again received the predetermined number of coins to be bagged or packaged.

In case it is desirable to redeliver coins which have been deposited from one of the receptacles 10 upon the inspection table 2 in said receptacle 10 without recounting the same, the counting mechanism for that particular denomination of coin may be thrown out of operation by raising the counting actuating rod 71, Fig. 22, out of engagement with the pin 69 upon the counter actuating lever 66. This may be effected by actuating the rock arm 72 as heretofore described.

Under similar circumstances the coin adding mechanism may be temporarily thrown out of operation by detaching the rack, as, for example, 117, Fig. 11, from its corresponding lever 52, Figs. 8 and 9. On the other hand if it is desired to recount coin of a given denomination the same may be returned from the inspection table to the separating and distributing tray 6 by the conveyer 5 and again passed through the corresponding counting mechanism, the adding mechanism at such time being rendered inoperative as above described.

By the various mechanisms and operations heretofore described therefore accumulations of coins of different denominations may be separated, according to such denominations, mutilated or imperfect coin ejected from the mass, the perfect coin of the several denominations separately counted and the total amount represented thereby added and registered, and the different denominations of coin segregated and bagged in separate receptacles. Furthermore the ejected coin may be redelivered from the ejection receptacle to the separating and distributing mechanism and thence to the counting and adding mechanism for verification.

Should there be any doubt in the operator's mind as to the accuracy of the count of any of the several denominations of coin, the same may be conveniently redelivered to the inspection table and subjected to a manual count, if desired, or returned to the separating and distributing mechanism and the counting mechanism for a recount by the machine.

Where the amount of coin of any denomination is less than one or several times the predetermined amounts into which it is to be divided, such fractional part of the total amount may be segregated and disposed of as desired.

While I have herein described particular embodiments of the various mechanisms which constitute my invention, it is to be understood that any or all of said mechanisms may be varied in detail and arrangement of parts and that the general construction and arrangement of the machine may be varied within the spirit and scope of the invention.

What I claim is:

1. A coin handling machine comprising in combination a table for the reception of coin, a hopper adjacent thereto arranged to receive the coin therefrom, coin separating and distributing means, means for conveying the coin from said hopper to said separating and distributing means, coin operable counting mechanism, coin operable adding mechanism, means for conveying the coin from said separating and distributing means to said counting and adding mechanisms, a plurality of coin receptacles each adapted to receive coin of a given denomination from said counting and adding mechanisms, and means for depositing a predetermined number of coins in each of said receptacles.

2. A coin handling machine comprising in combination a hopper for the reception of coin, coin separating and distributing mechanism, means for conveying the coin from said hopper to said separating and distributing mechanism, coin counting mechanism, coin adding mechanism, means for conveying the coin from said separating and distributing mechanism to said counting and adding mechanisms, and means interposed in said the last mentioned conveying means for ejecting mutilated or spurious coin, a plurality of coin receptacles each adapted to receive coin of a given denomination from said counting and adding mechanisms, and means for depositing a predetermined number of coins in each of said receptacles.

3. A coin handling machine comprising in combination a table for the reception of coin, a hopper located adjacent said table and arranged to receive the coin therefrom, coin separating and distributing mechanism having means to agitate the same to sort and distribute the coins, means for conveying the coin from said hopper to said separating and distributing mechanism, coin operable counting mechanism, coin operable adding mechanism for the coins of each denomination, means for separately conveying the coins of each denomination to said counting and adding mechanisms respectively, means interposed in each of said separate conveying means for ejecting spurious or mutilated coin, a coin receptacle adjacent each of said counting and adding mechanisms adapted respectively to receive the coins therefrom, and means to interrupt delivery of coins to said receptacles after a predetermined number have been delivered thereto respectively.

4. A coin handling machine comprising in combination a table for the reception of coin, a hopper adjacent thereto, coin separating and distributing means, means for conveying the coin from said hopper to said separating and distributing means, coin operable counting mechanism, coin operable adding mechanism, and means for conveying the coin from said separating and distributing means to said counting and adding mechanisms.

5. A coin handling machine comprising in combination a table for the reception of coin, a hopper located adjacent said table and arranged to receive the coin therefrom, coin separating and distributing mechanism having means to agitate the same to sort and distribute the coin, and means for conveying the coin from said hopper to said separating and distributing mechanism, coin operable counting mechanism, coin operable adding mechanism for the coins of each denomination, means for separately conveying the coins of each denomination to said counting and adding mechanisms respectively, and means interposed in each of said separate conveying mechanisms for ejecting spurious or mutilated coin.

6. A coin handling mechanism comprising in combination a receptacle for the deposit of coin, coin separating and distributing mechanism, having means to actuate the same to separate and distribute the coin, means for conveying the coin from said receptacle to said separating and distributing means, means for counting and adding the coins of each denomination, means for separately conveying the coins of each denomination from said separating and distributing mechanism to said counting and adding mechanism, receptacles adjacent the counting and adding mechanisms for the coins of each denomination respectively to receive the coins therefrom, and means for delivering coin from said receptacles.

7. A coin handling machine comprising in combination a coin receptacle, coin separating and distributing mechanism comprising an inclined tray having a series of sets of apertures arranged transversely thereof increasing in diameter successively from one to the opposite end of said tray, means for delivering coin from said receptacle to said separating and distributing mechanisms, coin counting and adding mechanism, and means for separately conveying the coin of each denomination from said separating and distributing mechanism to said counting and adding mechanisms, and means for delivering the coin separated according to the denominations thereof from said counting and adding mechanisms.

8. A coin handling machine comprising in combination coin separating and distributing mechanism, means for actuating said mechanism to sort the coin into its various denominations, separate coin counting mechanism for the coins of each denomination, coin adding mechanisms arranged to add the total coin passed through the machine, means for separately conveying the coins of different denominations to said counting mechanisms respectively, connections whereby the operation of said counting mechanisms will actuate said adding mechanisms, and means for delivering the coin from said counting and adding mechanisms.

9. A coin handling machine comprising in combination coin separating and distributing mechanism, means to actuate said mechanism to separate and distribute the coin, coin counting and adding mechanisms, means for separately conveying the coins of each denomination from said separating and distributing mechanism to said counting and adding mechanisms, a plurality of coin receptacles arranged adjacent said counting and adding mechanisms to separately receive the coins of each denomination, and means for delivering the coin from said receptacles.

10. A coin handling machine comprising in combination coin separating and distributing mechanism consisting of a tray inclined from one end to the other and having successive sets of apertures arranged transversely thereof of a diameter to receive coins from the largest to the smallest diameter respectively, means for depositing coins of different denominations upon the upper end of said tray, means for actuating said tray to cause said coin to traverse said tray whereby the coins of gradiently increased diameter will fall successively through the apertures of each set, coin counting and adding mechanisms, means for separately conveying the coins of each denomination to said counting and adding mechanisms, and means for delivering the coin from said counting and adding mechanisms.

11. A coin handling machine comprising in combination coin separating and distributing mechanism consisting of a tray inclined from one end to the other and having means to agitate the same to separate and distribute the coin and having successive sets of coin apertures arranged transversely thereof, said sets of apertures increasing in diameter from the upper to the lower end of the tray, steps between each set of apertures over which the coins fall in their passage from one to the opposite end of the tray, whereby the coins of a mass passing over said tray will successively pass through said apertures according to the diameter of the coin, coin counting and adding mechanisms, means for separately conveying the coins of each denomination from the different sets of apertures of the coin tray to said counting and adding mechanisms and means for delivering the coin from said counting and adding mechanisms.

12. A coin handling machine comprising in combination coin separating and distributing mechanism, means for depositing an accumulation of coins thereon, coin counting and adding mechanisms, means for separately delivering the coins of each denomination from said separating and distributing mechanisms to said counting and adding mechanisms, means interposed in said coin delivering mechanism to eject spurious and mutilated coin, a receptacle to receive such spurious and mutilated coin, and means to deliver such rejected coin to said receptacle.

13. A coin handling machine comprising in combination coin separating and distributing mechanism to separate the coin into its several denominations, coin counting and adding mechanisms, means for separately delivering the coins of each denomination from said separating and distributing mechanism to said counting and adding mechanisms, means interposed in each of said coin delivery mechanisms to eject spurious and mutilated coin therefrom, a common receptacle for said spurious and mutilated coin and means for conveying the ejected coin thereto.

14. A coin handling machine comprising in combination coin separating and distributing mechanism adapted to separate the coin into its different denominations, coin counting and adding mechanisms, means for separately delivering the coins of each denomination from said separating and distributing mechanism to said counting and adding mechanisms, a pair of parallel rotating disks interposed in each of said delivery mechanisms constructed and arranged to receive the coin and eject spurious and mutilated coin from said delivery mechanism, a common receptacle for said spurious and rejected coin, and means for conveying the coin from said several ejecting mechanisms to said common receptacle.

15. A coin handling machine comprising in combination coin separating and distributing mechanism constructed and arranged to separate the coin into its several denominations, coin counting and adding mechanisms, means for separately delivering the coin from said separating and distributing mechanism to said counting and adding mechanisms, means interposed in each of said delivery mechanisms for ejecting mutilated and spurious coin, each comprising a pair of parallel disks located upon either side of the path of the coin in said delivery mechanism, the distance between said disks being just sufficient to pass a perfect coin, and whereby spurious and mutilated coins will be ejected from said delivery path, a common receptacle for said spurious and mutilated coin, and means for conveying said coin from said several ejecting mechanisms to said common receptacle.

16. A coin handling mechanism comprising in combination coin separating and distributing mechanism constructed and arranged to separate the coin into its several denominations, coin counting and adding mechanisms, means for delivering the coin from said separating and distributing mechanism to said counting and adding mechanisms, means for ejecting spurious and mutilated coin from said several delivery mechanisms interposed in each of the latter and consisting of a pair of parallel rotating disks located upon either side of the path of the coin, the distance between said disks being only sufficient to pass a perfect coin of given thickness, means for expelling said spurious and mutilated coins from between said disks, a common receptacle for said spurious and mutilated coin, means for conveying such coin from said several ejecting mechanisms to said common receptacle.

17. A coin handling machine comprising in combination coin separating and distributing mechanism, means for depositing coin thereon, coin counting and adding mechanism, means for separately delivering the coins of each denomination from said separating and distributing mechanism to said counting and adding mechanisms, means interposed in each of said delivery mechanisms for ejecting spurious and mutilated coin, and means in each of said delivery mechanisms for ejecting coins of less diameter than that for which said delivery mechanism is intended, and means for redepositing said last mentioned coin upon said separating and distributing mechanism.

18. A coin handling machine comprising in combination coin separating and distributing mechanism, means for depositing an accumulation of coins thereon, coin counting and adding mechanisms, means for separately delivering coins of each denomination from said separating and distributing mechanism to said counting and adding mechanisms, means in each of said delivering mechanisms to reject coins of less diameter than that for which said delivery mechanism is intended, and means for redepositing said rejected coins upon said separating and distributing mechanism.

19. A coin handling machine comprising in combination coin separating and distributing mechanism for separating and distributing coins of various diameters, means for depositing an accumulation of coins of various denominations upon said separating and distributing mechanism, coin counting and adding mechanisms, means for separately delivering the coins of each denomination from said separating and distributing mechanism to said counting and adding mechanisms, means for ejecting from each of said delivery mechanisms coins of smaller diameter than that for which they are respectively intended, a hopper located adjacent said delivery mechanisms to receive said rejected coin, and means adjacent said hopper to convey said rejected coins back to said coin separating and distributing mechanism.

20. A coin handling machine comprising in combination coin separating and distributing mechanism for separating and distributing coins of various diameters, coin counting and adding mechanisms, a plurality of chutes for separately conveying the coins of different diameters from said separating and distributing mechanism to said counting and adding mechanisms, each of said chutes being laterally inclined for a portion of its length and having an opening in said inclined portion whereby coins of less diameter than that for which said chute is intended will be ejected therefrom, means adjacent said chutes for receiving said ejected coins and for conveying the same back to said separating and distributing mechanism.

21. A coin handling machine comprising in combination coin separating and distributing mechanism arranged to separate and distribute coins according to their different diameters, means for depositing an accumulation of coin upon said separating and distributing mechanism, coin counting and adding mechanisms, a plurality of chutes for separately delivering the coins of different diameters from said separating and distributing mechanism to said counting and adding mechanisms, a pair of rotating disks interposed in said chutes located upon opposite sides of the path of the coin therein and spaced apart only sufficiently to pass a perfect coin, whereby said disks will retain imperfect coins and eject the same from the coin path, said chutes respectively being laterally inclined for a portion of their length and each having an opening at one side of said inclined portion to eject coins of less diameter than that for which the chute is intended, a common receptacle for said imperfect coin, and means for conveying said imperfect coin from said separating and delivering mechanisms to said common receptacle, means for conveying said ejected perfect coins from said delivery mechanism back to said separating and distributing mechanism.

22. A coin handling machine comprising in combination coin separating and distributing mechanism, coin counting and adding mechanisms, mechanism for separately delivering the coin from said separating and distributing mechanism to said counting and adding mechanisms, means interposed in said delivery mechanism for ejecting spurious or mutilated coins, a receptacle for such spurious or mutilated coins, and means for conveying said ejected coin to said receptacle, and means whereby coin may be redelivered from said receptacle to said separating and distributing mechanism.

23. A coin handling machine comprising in combination a coin receiving and inspection table, coin separating and distributing mechanism, means for conveying coin from said table to said separating and distributing mechanism, coin counting and adding mechanisms, means for separately delivering the coin of different denominations to said counting and adding mechanisms, means interposed in said delivery mechanism for ejecting spurious or mutilated coins therefrom, a receptacle for said ejected coins and means for conveying said ejected coins from said ejecting mechanism to said receptacle, and means for re-depositing said ejected coin from said receptacle upon said inspection table.

24. A coin handling machine comprising in combination a coin receiving and inspection table, coin separating and distributing mechanism, coin counting and adding mechanisms, mechanism for separately delivering the coins of different denominations from said separating and distributing mechanism to said counting and adding mechanisms, receptacles for separately receiving the coins of different denominations from said counting and adding mechanisms, having means to re-deliver the coin upon said inspection table.

25. A coin handling machine comprising in combination a coin receiving and inspection table, coin separating and distributing means, means for conveying the coin from said table to said separating and distributing means, coin counting and adding mechanisms, means for separately delivering the coin from said separating and distributing mechanism to said counting and adding mechanisms, receptacles for separately receiving the coins of each denomination from said counting and adding mechanisms, said receptacles having means to re-deliver the coins upon said inspection table, means for supporting bags or other receptacles adjacent the said first named receptacles, and means for delivering coins from said first named receptacle to said bags or other receptacles.

26. A coin handling machine comprising in combination a coin receiving and inspection table, coin separating and distributing mechanism, means for conveying coin from said table to said separating and distributing mechanism, coin counting and adding mechanisms, means for separately delivering coins of different denominations to said counting and adding mechanisms, means interposed in each of said delivery means for ejecting spurious or mutilated coin, a receptacle for said ejected coin, means for conveying coin from said ejecting mechanism to said receptacle, said receptacle having means to re-deposit the coin upon said inspection table, and having means to re-deliver the coin to said conveying mechanism at the will of the operator.

27. A coin handling machine comprising in combination coin separating and distributing mechanism, coin counting and adding mechanisms for the coins of each denomination, means for separately delivering the coins of different denominations from said separating and distributing mechanism to said counting and adding mechanisms respectively, a receptacle adjacent each of said counting and adding mechanisms to receive the coins passed therethrough, means for interrupting delivery of coin to said receptacle after a predetermined number have been delivered thereto, a supplementary receptacle adjacent each of said receptacles and means for delivering coin in excess of said predetermined number into said supplementary receptacle.

28. A coin handling machine comprising in combination coin separating and distributing mechanism, coin counting and adding mechanisms, means for separately delivering coin of different denominations from said separating and distributing mechanism to said counting and adding mechanisms, a receptacle adjacent each of said counting and adding mechanisms arranged to receive the coins delivered therefrom, means for interrupting the delivery of coin to said receptacles respectively when a predetermined number of coins have been delivered thereto, a supplementary receptacle adjacent each of said receptacles, means for delivering coin in excess of said predetermined number to said supplementary receptacles, means for delivering the coin from said first named receptacles, and means for delivering coin from said supplementary receptacles to said first named receptacle.

29. A coin handling machine comprising in combination coin separating and distributing mechanism arranged to separate coins according to their different diameters, coin counting and adding mechanisms, means for separately delivering coin of different diameters to said counting and adding mechanisms, means interposed in said delivery mechanism for passing coin of a given thickness and for ejecting coin of a greater thickness, a receptacle and means for conveying said ejected coin from said ejecting means to said receptacle.

30. A coin handling machine comprising in combination coin separating and distributing mechanism having means to separate the coin according to their different diameters, coin counting and adding mechanisms, means for separately delivering coin of different diameters from said separating and distributing mechanism to said counting and adding mechanisms, means interposed in said delivery mechanism for permitting the passage of coin of a given thickness to said counting and adding mechanisms and preventing the passage of coin of a greater thickness to said counting and adding mechanisms.

31. A coin handling machine comprising in combination coin separating and distributing mechanism having means to separate the coins according to their different diameters, coin counting and adding mechanisms, means for separately delivering coins of different diameters from said separating and distributing mechanism to said counting and adding mechanisms, rotating members located adjacent the opposite sides of each of said delivery means, spaced apart to permit the passage of coin of a given thickness to said counting and adding mechanisms and to prevent the passage of coin of greater thickness to said counting and adding mechanisms, a receptacle and means for delivering the rejected coin from said rejecting mechanism to said receptacle.

32. A coin handling machine comprising in combination coin separating and distributing mechanism, having means to separate the coin according to differences in diameter thereof, coin counting and adding mechanisms constructed and arranged to be operated by said coins of different diameters, means for separately delivering the coins of different diameters from said separating and distributing mechanism to said counting and adding mechanisms respectively, a pair of rotating disks located respectively upon opposite sides of each of said delivery means and spaced apart to permit the passage of a coin of given thickness to said counting and adding mechanisms, and to prevent the passage of a coin of greater thickness to said counting and adding mechanisms, means for expelling said rejected coin from between said disks, a receptacle and means to convey the coin from said disks to said receptacle.

33. A coin handling machine comprising in combination coin separating and distributing mechanism having means to separate coins according to their different diameters, coin operable counting and adding mechanisms for the coins of each diameter respectively, means for separately delivering the coins of different diameters from said separating and distributing mechanism to said counting and adding mechanisms respectively, means adjacent each of said delivery means to permit the passage of coins of a given thickness to said counting and adding mechanisms and to prevent the passage of coins of a greater thickness to said counting and adding mechanisms, each of said delivery means having means to eject coins of less diameter than that for which they are intended respectively.

34. A coin handling machine comprising in combination coin separating and distributing mechanism having means to separate the coin according to their different diameters, coin operable counting and adding mechanisms for coins of the different diameters respectively, means adjacent each of said delivery means for permitting the passage of coin of a given thickness to said counting and adding mechanisms, and for preventing the passage of coins of a greater diameter to said counting and adding mechanisms, and means for conveying said rejected coin back to said separating and distributing mechanism.

35. A coin handling machine comprising in combination coin separating and distributing mechanism having means to separate the coins according to their different diameters, coin counting and adding mechanisms constructed and arranged to be operated by the coins of different diameters respectively, means for separately delivering coins of different diameters to their corresponding counting and adding mechanisms respectively, means interposed in each of said delivery means for permitting the passage of coins of given thickness to said counting and adding mechanisms and for preventing the passage of coins of a greater thickness to said counting and adding mechanisms, and means in each of said delivery means for ejecting coins of a less diameter than that for which said delivery means are respectively intended, and means for conveying said rejected coin back to said separating and distributing mechanism.

36. A coin handling machine comprising in combination coin separating and distributing mechanism, coin counting and adding mechanisms, means for separately delivering the coins of different diameters to said counting and adding mechanisms, and means interposed in said delivery means to prevent overloading thereof.

37. A coin handling machine comprising in combination coin separating and distributing mechanism, coin counting and adding mechanisms, means for separately delivering coins of different denominations from said separating and distributing mechanism to said counting and adding mechanisms, means interposed in said delivery means respectively to agitate the coins therein and prevent stoppage of the same.

38. A coin handling machine comprising in combination coin separating and distributing mechanism adapted to separate the coins of different diameters, coin counting and adding mechanisms, means for separately delivering the coins of different diameters from said separating and distributing means to said counting and adding means, means interposed in each of said delivery means to eject surplus coin therefrom, and means to convey said surplus coin back to said separating and distributing mechanism.

39. A coin handling machine comprising in combination a coin table, coin separating and distributing mechanism having means to separate coins of different diameters, means to convey coins from said table thereto, separate coin counting mechanisms for coins of different diameters respectively, means for separately and simultaneously delivering a plurality of coins from said separating and distributing mechanism to its corresponding counting mechanisms respectively, means connected with said counting mechanisms for adding the total amount represented by said coin, said counting and adding mechanisms being arranged to be operated by the passage of the coin.

40. A coin handling machine comprising in combination a coin table, coin separating and distributing mechanism arranged to separate the coin of different diameters, means to convey coins from said table thereto, separate coin counting mechanisms for coins of each diameter, means for separately and simultaneously delivering a plurality of coins from said separating and distributing mechanism to their corresponding counting mechanisms respectively, means for adding the total amount represented by the coins passing through said counting mechanisms, said counting mechanisms arranged to be successively operated by the coins of different diameters, and means whereby said adding mechanism is simultaneously operated with each of said counting mechanisms.

41. A coin handling machine comprising in combination a coin table, coin separating and distributing mechanism having means to separate the coin according to their different diameters, means to convey coins from said table thereto, coin counting mechanism for the coins of each diameter respectively, means for separately and simultaneously delivering a plurality of coins of different diameters from said separating and distributing mechanism to their corresponding counting mechanisms respectively, said delivery means being constructed and arranged to operate said counting mechanisms successively, coin adding mechanism operatively connected to all of said counting mechanisms whereby said adding mechanism will be actuated upon the operation of each of said counting mechanisms.

42. A coin handling machine comprising in combination a coin table, coin separating and distributing mechanism having means to separate the coin according to their different diameters, means to convey coins from said table thereto, coin counting mechanism for the coin of each diameter respectively, means for separately delivering the coins of different diameter to its corresponding counting mechanism, a receptacle adjacent each of said counting mechanisms, means for delivering the coin from said counting mechanisms to said receptacles respectively, and means for interrupting the said delivery after a predetermined number of coins have been delivered to each of said receptacles respectively and means for delivering the coin from said receptacles.

43. A coin handling machine comprising in combination a coin table, coin separating and distributing mechanism having means to separate the coins according to their different diameters, means to convey coins from said table thereto, coin counting mechanism for the coin of each diameter respectively, means for separately and simultaneously delivering the coins of different diameters from said separating and distributing mechanism to their corresponding counting mechanisms respectively, a coin receptacle in communication with each of said counting mechanisms, means for delivering coin from said counting mechanisms to said receptacles respectively, means for interrupting said delivery after a predetermined number of coins have been delivered to each of said receptacles, a supplementary receptacle adjacent each of said first named receptacles, and means for delivering coin in excess of said predetermined number to said supplementary receptacle.

44. A coin handling machine comprising in combination a coin table, coin separating and distributing mechanism having means to separate the coin according to their different diameters, means to convey coins from said table thereto, coin counting mechanisms for the coins of each diameter respectively, means for separately and simultaneously delivering the coins of each denomination to its corresponding counting mechanism, mechanism for adding the total amount represented by the coins constructed and arranged to be actuated simultaneously with the actuation of said counting mechanisms respectively.

45. A coin handling machine comprising in combination a coin table, coin separating and distributing mechanism having means to separate the coins according to their different diameters, means to convey coins from said table thereto, coin counting mechanism arranged to separately count the coins of different diameters, means for separately delivering the coins of each diameter to its corresponding counting mechanism, a coin receptacle adjacent each of said counting mechanisms, means for delivering a predetermined number of coins of each diameter from said counting mechanisms to said receptacles respectively, a supplementary receptacle adjacent each of said first named receptacles, and means for delivering coins in excess of said predetermined number from said counting mechanisms to said supplementary receptacles respectively.

46. A coin handling machine comprising in combination a coin receiving and inspection table, coin separating and distributing mechanism having means to separate the coins according to their different diameters, means for conveying coin to said table from said separating and distributing mechanism, separate coin counting mechanism for the coins of different diameters respectively, means for separately delivering the coin of different diameters to their corresponding counting mechanisms, a coin receptacle adjacent each of said counting mechanisms arranged to receive the coin therefrom, and means to deliver the coin from said receptacles to said inspection table.

47. A coin handling machine comprising in combination a coin receiving and inspection table, coin separating and distributing mechanism, having means to separate the coins according to their different diameters, means for conveying the coin from said table to said separating and distributing mechanism, separate coin counting mechanism for the coin of each diameter respectively, means for separately delivering the coin of each diameter to its corresponding counting mechanism, a coin receptacle adjacent each of said counting mechanisms, means for delivering a predetermined number of coins to said receptacle from said counting mechanisms, means for preventing the delivery of coins in excess of said predetermined number to said receptacles, means for delivering the coin from said receptacles to said inspection table, and means for separately delivering said excess coins to said inspection table.

48. A coin handling machine comprising in combination a coin receiving and inspection table, coin separating and distributing mechanism having means to separate the coins according to their diameters, means for conveying the coin from said inspection table to said separating and distributing mechanism, coin counting mechanisms for the coins of each diameter respectively, means for separately delivering the coin from said separating and distributing mechanism to its corresponding counting mechanism, and means for re-depositing the coin from said counting mechanism upon said inspection table.

49. A coin handling machine comprising in combination an inspection table, coin separating and distributing mechaism having means to separate the coin according to their different diameters, means for conveying coin from said inspection table to said separating and distributing mechanism, separate coin counting mechanism for the coins of each diameter respectively, means for separately delivering the coin of different diameters to their corresponding counting mechanisms respectively, means for adding the total amount represented by the coins passed through said several counting mechanisms constructed and arranged to be operated simultaneously with the operation of each of said counting mechanisms, and means for re-delivering the coin from said counting mechanisms to said inspection table.

50. A coin handling machine comprising in combination a coin receiving and inspection table, coin separating and distributing mechanism having means to separate the coin according to their different diameters, means for conveying the coin from said table to said separating and distributing mechanism, coin operable counting mechanism for the coins of each diameter respectively, means for separately delivering the coin of different diameters to their corresponding counting mechanisms, said counting mechanisms being constructed and arranged to be actuated successively by the coins passing therethrough, means for adding the total amount represented by the coins passing through said counting mechanism, operative connections between said counting mechanisms and said adding mechanisms, whereby the latter will be operated successively by all of said counting mechanisms.

51. A coin handling machine, comprising in combination coin separating and distributing mechanisms, having means to separate the coins according to their different diameters, a plurality of coin receptacles each designed to receive coins of a single denomination, means for feeding the coins of each denomination separately from said separating and distributing mechanism to the proper receptacle therefor, means for shutting off the delivery of coins to said receptacles after a pre-determined number of coins have been delivered, a supplemental receptacle adjacent each of said coin receptacles, and means for diverting the excess of coins of each denomination from its main receptacle to said supplemental receptacle.

CHARLES S. BATDORF.

Witnesses:
RALPH C. POWELL,
M. E. GARRETT.